US 6,535,076 B2

(12) United States Patent
Partridge et al.

(10) Patent No.: US 6,535,076 B2
(45) Date of Patent: Mar. 18, 2003

(54) SWITCHED CHARGE VOLTAGE DRIVER AND METHOD FOR APPLYING VOLTAGE TO TUNABLE DIELECTRIC DEVICES

(75) Inventors: Alden Partridge, Columbia, MD (US); Peter Acsadi, Parkton, MD (US); Guy Omictin, Alexandria, VA (US); John Robinson, Mt. Airy, MD (US); Herbert Jefferson Henderson, Odenton, MD (US)

(73) Assignees: Silicon Valley Bank, Santa Clara, CA (US); Gatx Ventures, Inc., Lafayette, CA (US)

( * ) Notice: Subject to any disclaimer, the term of this patent is extended or adjusted under 35 U.S.C. 154(b) by 74 days.

(21) Appl. No.: 09/855,949

(22) Filed: May 15, 2001

(65) Prior Publication Data

US 2002/0171502 A1 Nov. 21, 2002

(51) Int. Cl.[7] .............................................. H03H 11/00
(52) U.S. Cl. ...................................... 333/17.1; 333/156
(58) Field of Search ............................... 333/17.1, 139, 333/164, 205, 235, 156; 327/530; 307/125, 130

(56) References Cited

U.S. PATENT DOCUMENTS

| 5,312,790 A | | 5/1994 | Sengupta et al. |
| 5,427,988 A | | 6/1995 | Sengupta et al. |
| 5,486,491 A | | 1/1996 | Sengupta et al. |
| 5,617,104 A | * | 4/1997 | Das .......................... 333/99 S |
| 5,635,433 A | | 6/1997 | Sengupta |
| 5,635,434 A | | 6/1997 | Sengupta |
| 5,693,429 A | | 12/1997 | Sengupta et al. |
| 5,721,194 A | * | 2/1998 | Yandrofski et al. ....... 333/24 C |
| 5,766,697 A | | 6/1998 | Sengupta et al. |
| 5,830,591 A | | 11/1998 | Sengupta et al. |
| 5,846,893 A | | 12/1998 | Sengupta et al. |
| 6,078,223 A | * | 6/2000 | Romanofsky et al. ... 331/107 S |
| 6,329,959 B1 | * | 12/2001 | Varadan et al. ...... 343/700 MS |

FOREIGN PATENT DOCUMENTS

| WO | WO 00/24079 | 4/2000 |
| WO | WO 00/28613 | 5/2000 |
| WO | WO 00/35042 | 6/2000 |

OTHER PUBLICATIONS

U.S. patent application Ser. No. 09/594,837, Chiu, filed Jun. 15, 2000.
U.S. patent application Ser. No. 09/768,690, Sengupta, No Date.

* cited by examiner

Primary Examiner—Seungsook Ham

(57) ABSTRACT

A circuit for providing a control voltage for tunable dielectric devices, the circuit comprising an input for receiving a voltage command signal, a charging circuit for establishing a desired voltage level on a first capacitor in response to the voltage command signal, and a switch for switching voltage on the first capacitor to a tunable dielectric device to control a dielectric constant of tunable dielectric material in the tunable dielectric device. A second capacitor, second charging circuit, and second switch can be used to provide voltage to the tunable dielectric device during charging or discharging of the first capacitor. The method for providing a control voltage for tunable dielectric devices performed by these circuits is also included.

20 Claims, 2 Drawing Sheets

US 6,535,076 B2

SWITCHED CHARGE VOLTAGE DRIVER AND METHOD FOR APPLYING VOLTAGE TO TUNABLE DIELECTRIC DEVICES

FIELD OF THE INVENTION

This invention relates to electric circuits and methods for supplying control voltage to tunable dielectric devices, and more particularly to such circuits that can rapidly adjust the supplied voltage.

BACKGROUND OF THE INVENTION

Tunable dielectric materials are materials whose permittivity (more commonly called dielectric constant) can be varied by varying the strength of an electric field to which the materials are subjected. Even though these materials work in their paraelectric phase above the Curie temperature, they are conveniently called "ferroelectric" because they exhibit spontaneous polarization at temperatures below the Curie temperature. Tunable ferroelectric materials including barium-strontium titanate (BST) or BST composites have been the subject of several patents.

Tunable dielectric materials are recently receiving increased attention due to performance breakthroughs that overcome prior limitations. As a result of such breakthroughs, many commercially viable applications involving tunable dielectric materials are now imminent.

Current applications utilizing tunable materials vary widely and include scanning antennas for both point-to-multi-point and point-to-point applications. Also included are a wide range of tunable filter applications, voltage controlled oscillator applications, and delay line applications, as well as other applications including low cost frequency tunable patch antennas.

This has given rise to a need for low cost circuitry capable of providing a digitally controllable bias voltage to drive these tunable components. Such circuitry is typically referred to as a high voltage driver or as a high voltage switcher. Components based on tunable dielectric materials will typically require drive voltages ranging from tens of volts up to thousands of volts, with most commercially viable applications currently requiring hundreds of volts. Technology trends are toward lower drive voltages.

Tunable dielectric materials have several inherent advantages including sub-nanosecond response times and very low current draw under switching conditions. Low current draw translates into low power consumption by the tunable material. A low cost driver circuit that does not compromise these inherent advantages of the tunable dielectric materials would be highly desirable.

SUMMARY OF THE INVENTION

This invention provides a circuit for providing a control voltage for tunable dielectric devices, the circuit comprises an input for receiving a voltage command signal, a charging circuit for establishing a desired voltage level on a first capacitor in response to the voltage -command signal, and a switch for switching voltage on the first capacitor to a tunable dielectric device to control a dielectric constant of tunable dielectric material in the tunable dielectric device. A second capacitor, second charging circuit, and second switch can be used to provide voltage to the tunable dielectric device during charging or discharging of the first capacitor.

The invention also encompasses circuits for providing a control voltage for tunable dielectric devices, wherein the circuits comprise means for receiving a voltage command signal, means for establishing a desired voltage level on a first capacitor in response to the voltage command signal, and means for switching voltage on the first capacitor to a tunable dielectric device to control a dielectric constant of tunable dielectric material in the tunable dielectric device. A second capacitor, means for charging the second capacitor, and means for switching voltage on the second capacitor to a tunable dielectric device can be used to provide voltage to the tunable dielectric device during charging or discharging of the first capacitor.

The invention further encompasses a method for providing a control voltage for tunable dielectric devices, the method comprising the steps of receiving a voltage command signal, establishing a desired voltage level on a first capacitor in response to the voltage command signal, and switching voltage on the first capacitor to a tunable dielectric device to control a dielectric constant of tunable dielectric material in the tunable dielectric device. The method can further include the steps of establishing a desired voltage level on a second capacitor in response to the voltage command signal, and switching voltage on the second capacitor to the tunable dielectric device to control the dielectric constant of the tunable dielectric material in the tunable dielectric device.

The circuits and method of this invention can be used to control the dielectric constant of tunable dielectric materials in a variety of devices to provided rapid changes in the dielectric constant of the tunable materials, and therefore rapid changes in the performance characteristics of the tunable dielectric devices.

DESCRIPTION OF THE PREFERRED EMBODIMENT

This invention provides a voltage control circuit that can rapidly switch control voltage for tunable dielectric devices to achieve rapid adjustment of the dielectric constant of the tunable materials in such devices.

Figure 1:
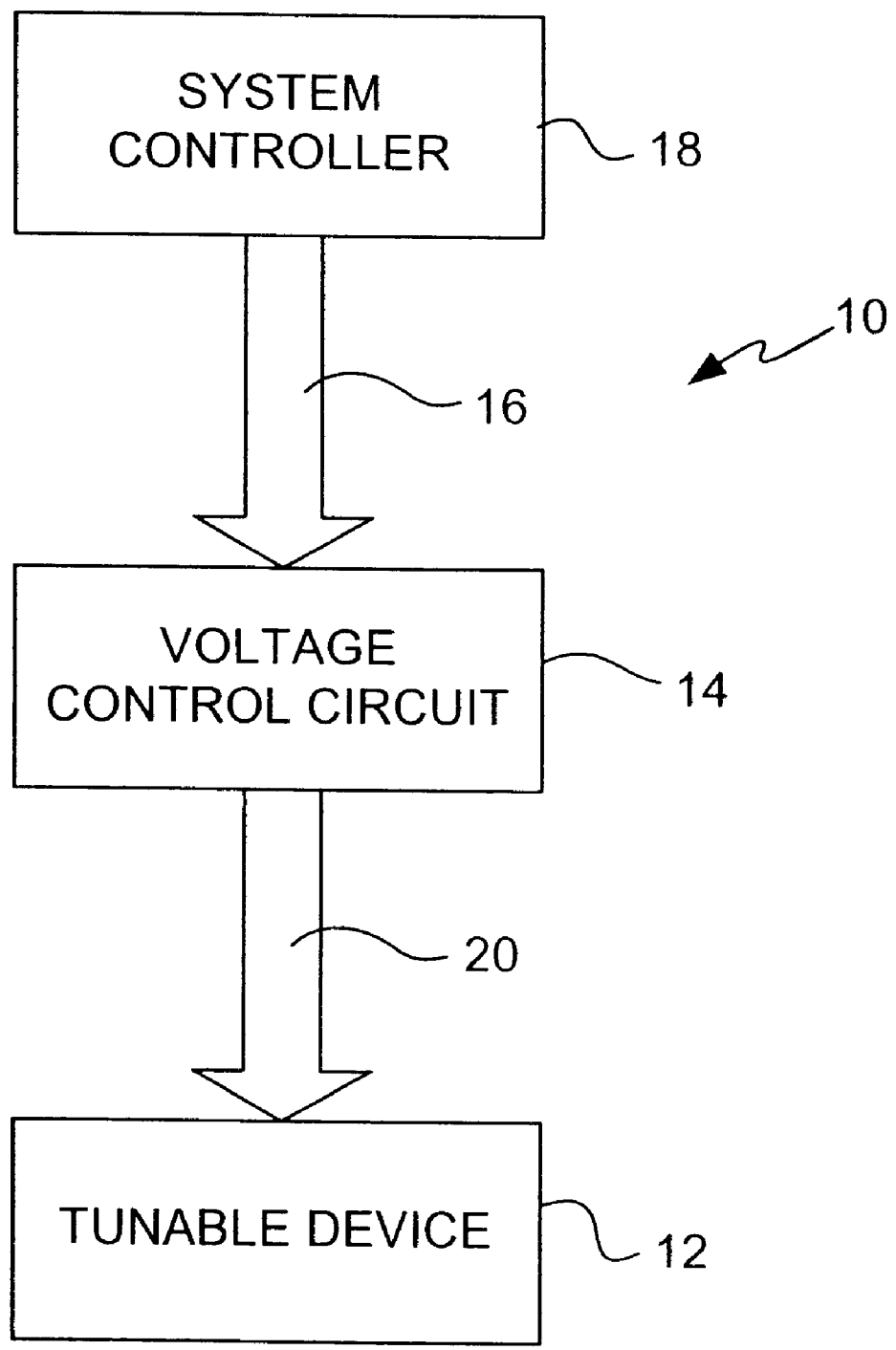
FIG. 1 is a block diagram of a tunable dielectric device control system that can incorporate the present invention.

Referring to the drawings, FIG. 1 is a block diagram of a tunable dielectric device control system 10 that can incorporate the present invention. A tunable dielectric device 12 such as a tunable filter, phase shifter, microstrip line, wave guide, etc. includes a tunable dielectric material having a dielectric constant that is controlled by the application of an electric field to the material. A voltage control circuit 14 constructed in accordance with the present invention receives one or more control signals on bus 16 from a system controller 18 and delivers a control voltage to the tunable dielectric device on line 20. In one possible application of the invention, the tunable dielectric device, can be, for example, a phase shifter in a phased array antenna, and the system controller can be, for example, a beam steering control for the phased array antenna. It should be understood that such an application would utilize multiple tunable devices and multiple voltage control circuits.

Figure 2:
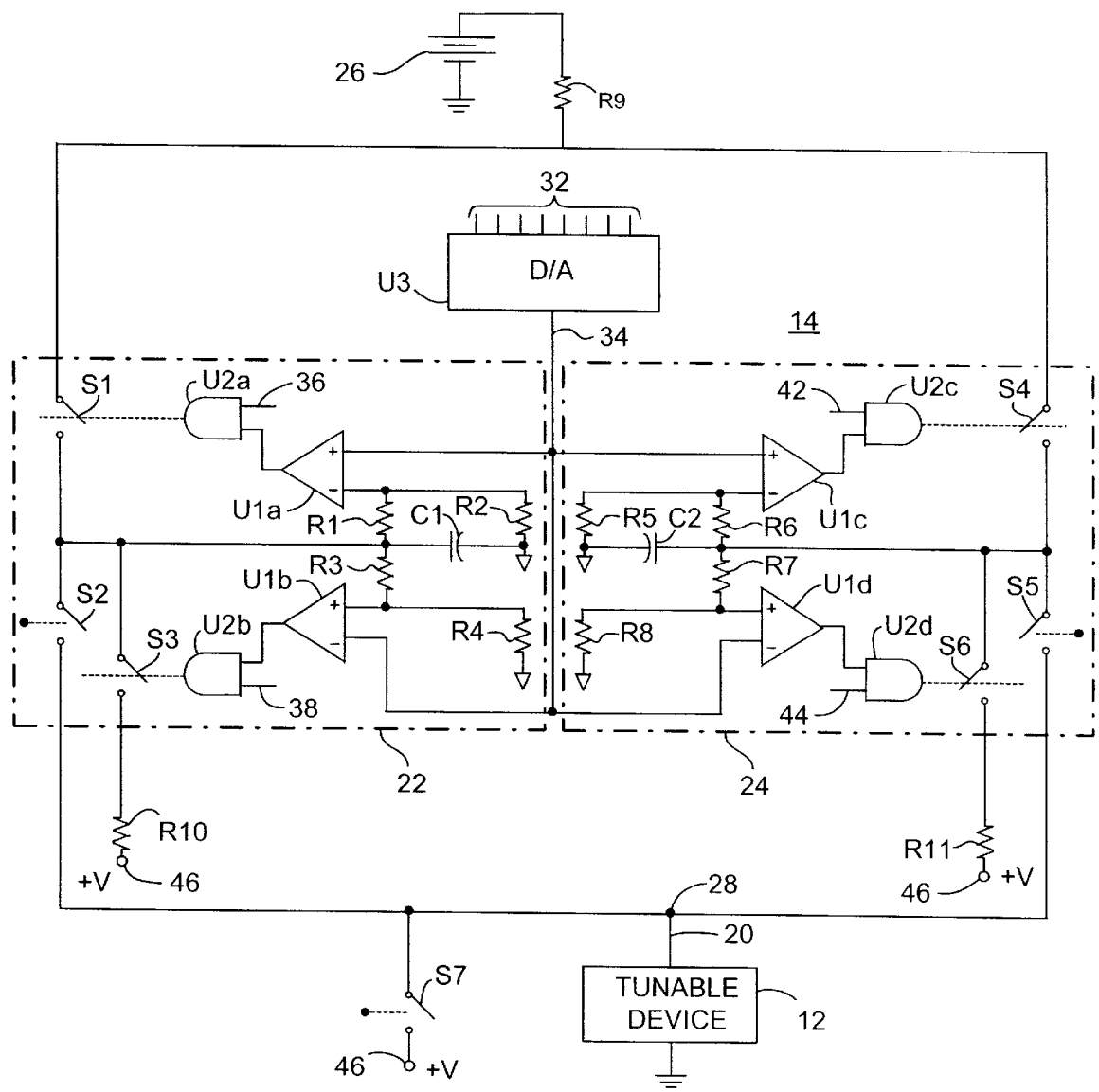
FIG. 2 is a schematic diagram of a voltage control circuit constructed in accordance with preferred embodiment of the present invention.

FIG. 2 is a schematic diagram of a voltage control circuit 14 constructed in accordance with a preferred embodiment of the present invention. The circuit includes two similar channels 22 and 24 that work in conjunction with one another to enable higher switching rates and to accommodate switching speeds measured in tens of nanoseconds. Channel 22 includes two comparators U1a and U1b, two AND gates U2a and U2b, a first capacitor C1, resistors R1, R2, R3, R4 and R10, and switches S1, S2 and S3. Channel 24 includes two comparators U1c and U1d, two AND gates U2c and U2d, a second capacitor C2, resistors R5, R6, R7, R8 and R11, and switches S4, S5 and S6. The left channel 22 is a mirror image of the right channel 24. An external voltage source 26 supplies a high voltage to the voltage control circuit through resistor R9. An output connection 28 is used to deliver the output voltage to a load 12, in the form of voltage tunable device.

With continued reference to FIG. 2, a certain degree of top to bottom symmetry is also present. The comparators U1a and U1c are used in independent feedback loops to handle the first of two operational cases. Likewise, comparators U1b and U1d are used in additional feedback loops to handle the second of two operational cases. The first operational case corresponds to times when a given commanded output voltage value is higher than the previously commanded output voltage for a given channel. The second operational case corresponds to times when the reverse is true, that is, when the present commanded output voltage is lower than the previous one. The voltage command signal on line 34 is used to control a voltage level on the capacitors. The capacitors are subsequently connected to the output terminal to deliver the desired voltage to the load.

The operation of the circuit of FIG. 2 can be explained by examining a single channel, one operational case at a time. To control the operation of the circuit, the digital-to-analog converter U3 receives a digital control signal on input lines 32 and produces an analog voltage command signal on line 34. The analog signal on line 34 is supplied to the left and right channels 22 and 24. The magnitude of the voltage command signal on line 34 is representative of a desired output voltage, also referred to as a commanded output voltage. That is, an output voltage that is to be delivered to the load in response to the digital control signal input on lines 32.

First, consider the case where the present desired output voltage is greater than prior output voltage. A digital input word on lines 32 is converted to an analog voltage by the digital-to-analog converter U3. The analog voltage on the output of U3 is then fed to the four comparators U1a through U1d. With focus on the left channel only, comparator U1a handles the case when the commanded voltage is higher than the previously commanded voltage. By default, some residual voltage level will exist on the negative input terminal of U1a. This pre-existing voltage level will correspond to the voltage level on capacitor C1 remaining from the prior switching operation. Assuming that the capacitor voltage does not decrease significantly when the capacitor is switched to the output terminal, the capacitor would be initially charged to substantially the previously commanded voltage level. A voltage divider including resistors R1 and R2 is used to produce a voltage at the negative input of compartor U1a. The level of this voltage will be dependent upon the resistance values of resistors R1 and R2, but in any case, it will be representative of the previously commanded voltage. In the case currently being considered the previously commanded voltage is lower than the presently commanded voltage. Given this, the input voltage seen by the negative terminal of the U1a comparator will be lower than the voltage command signal on line 34 and on the positive terminal of U1a. Thus, the output of comparator U1a will be in a high state.

An enable signal delivered on line 36 to AND gate U2a will thus close switch S1. The enable signal comes from the system's central processing unit, which is typically a microprocessor, but could be a gate array. In a case where the present invention is applied to a scanning antenna, a central processing unit (microprocessor or gate array) would perform all required beam steering commands and control all needed timing signals. In a scanning beam antenna, the central processing unit is usually called a beam steering controller.

Switch S1 will then remain closed until the voltage across capacitor C1 charges to a sufficient level to cause the output of comparator U1a to transition from high to low. When the output voltage on U1a transitions to a low state, switch S1 opens and C1 is left charged to a voltage that is representative of the voltage command signal resulting from the digital input word. Thereafter, and for as long as AND gate U2a receives an enable signal, S1 will automatically and temporarily close as required to replace leakage charge on C1. The effect will be that the voltage across C1 will be held near a value corresponding to a desired commanded voltage in response to the digital word on the input of digital-to-analog converter U3. The next step involves transferring the commanded voltage from C1 to the load. Switch control signals supplied by the system controller can be used to control the operation of switches S2, S5 and S7.

Before transferring the commanded voltage to the load, the previously commanded voltage must be cleared, or reset to a minimum value denoted as +V in the block diagram of FIG. 1. This operation results in a momentary lapse period, referred to as the switching time. A typical switching time for a scanning beam antenna for telecommunications applications is 100 nanoseconds. So, when designing a phase shifter driver circuit, about 50 nanoseconds would be allocated to the clearing operation and 50 nanoseconds would be allocated to the subsequent setting operation so that the total switching time would not exceed the 100 nanosecond requirement.

At an appropriate moment, external switch control signals will ensure that S2 is open and then S7 is momentarily closed long enough to ensure that the voltage across the load is reset to its minimum intended value. Immediately after the voltage across the load is reset, switch control signals will then ensure that S1 and S7 are open while S2 is closed. When S2 closes, the digitally commanded voltage stored on C1 will be transferred to the load. The tunable dielectric device load can be thought of as a capacitor in parallel with a very large resistance (measured in Gigaohms). With switch S2 closed, charge will flow from C1 onto the load capacitance. Charge will continue to flow until the voltage across the load capacitance equals the voltage across C1. C1 is purposely chosen to be many times larger than the load capacitance so that only a negligibly small decrease in voltage will occur when charging the load capacitance to the intended target value. Thus, by operating the circuit according to the sequence described above, a digitally commanded input word will have been converted to an analog voltage and applied across a load.

It should be understood that resetting is not necessary if the present commanded voltage is greater than the previously commanded voltage. In fact, it would be advantageous (for power conservation reasons) not to reset the voltage on the load when the pre-existing voltage is lower than the next commanded voltage. This is particularly the case for certain applications where the load capacitance is large (relatively speaking) and when switching rates are high (again, relatively speaking).

Next consider the case where the present commanded voltage is less than the prior commanded voltage. The same basic operational principles that applied above also apply to the case when the present commanded voltage is less than the prior commanded voltage. With continued reference to the left half of FIG. 1, a second comparator, U1b, is used when the commanded voltage is lower than the prior one. In this case, the voltage on the U1b positive input determined by the residual capacitor voltage, will be higher than the commanded voltage on the U1b negative terminal and the output of U1b will be high. An enable signal for U2b on line 38 will close S3 and begin discharging C1 to the voltage level set by +V on terminal 40. Discharging will continue until feedback through U1b causes S3 to open. In this manner, the voltage on C1 can be adjusted downward to a new target value that is lower than a previous commanded value. The remainder of the switching sequence proceeds as described under the first case.

It is important to note that unidirectional charging of C1 could be employed and thus the additional complexity of U1b and its supporting circuitry could be avoided. That is, C1 could be fully discharged to a minimum value corresponding to +V at the beginning of each switching cycle by opening S1 and simultaneously closing S2 and S7. Then, any future commanded voltage value would be guaranteed to be higher than the existing value on C1 because, by design, the current value would be the minimum useful value. Thus, C1 charging would always be in the same direction (from a lower voltage to a higher voltage).

However, the additional complexity added by U1b is warranted when consideration is given to power efficiency. At elevated switching voltages (i.e., hundreds of volts), considerable power is wasted if the charge on C1 is dumped after each switching cycle is complete. Instead, the use of two feedback loops established by U1a and U1b affords the flexibility to move directly from one voltage value on C1 to any other voltage value while minimizing the amount of charge thrown away from the previous switching operation. This scheme can lead to very significant power savings particularly at elevated switching rates measured in tens of kilo-hertz and at elevated switching voltages measured in hundreds of volts.

The circuit of FIG. 2 includes two identical switching channels. The second channel 24 is used to accommodate fast switching rates. This is because the time required to ready a desired voltage level on either C1 or C2 can be relatively long (microseconds in duration) compared to desired switching times (measured in tens of nanoseconds). Thus, one channel is being readied while the other channel is actually performing the driver function. In this way, the time required to ready a channel can be expanded considerably. Channel 24 would operate in the same manner as described for channel 22, with control signals being applied to enable inputs 42 and 44, voltage +V being supplied to terminal 46, and switch S5 being operated by an external switch control signal.

Using a two channel scheme, actual switching time is dependent upon the speed of two switching operations. Referring to the left channel, for example, the time to transition the load from its present voltage to its next voltage is the sum of the time required to reset the load and then re-charge it to its next value. The reset operation is dictated by the speed of S7 and the amount of resistance in series with the load capacitance. If S7 is chosen carefully, a reset operation can be accomplished in a matter of nanoseconds. Likewise, the time required for a setting operation is dictated by the speed of S2 and the amount of resistance in series with the load capacitance. Again, a setting operation can be accomplished in nanoseconds if S2 is chosen properly.

With reference to FIG. 2 it is noted that R10, R11, and switch S7 are connected to a voltage source denoted as +V. In a general sense, +V could represent zero volts and the mentioned components would then be connected to ground. The disclosed circuit would work under these conditions. However in certain applications it is not only possible, but also advantageous to recycle the charge from C1, C2, and the load. In such applications nodes that would normally be connected to ground for the purpose of dumping charge that is no longer needed can instead be connected to a power supply so that charge stored at an elevated voltage can be captured and reused at a lower voltage. The net effect will be increased power efficiency.

Due to certain characteristics of tunable ceramic materials the lowest voltage used to bias components made with the tunable ceramic materials is typically tens of volts. This fact is directly applicable to the power recycling discussed above. Given that the voltage across a tunable ceramic load never has to go to zero, the charge on that load can always be dumped into a node at a non-zero potential. It is indeed advantageous to not reset the voltage across a tunable ceramic load all the way to zero because of inherent properties of the tunable ceramic materials. Furthermore, because the load never needs to be set to zero volts, the switched source capacitors C1 and C2 need never be fully discharged either. Thus, the charge from C1 and C2 can also be dumped to a node at a non-zero potential and reused at a lower voltage.

Reclaiming charge from C1, C2, and the load capacitance saves power in two ways. Because these capacitors are never discharged below a minimum useable value, the effective charging voltage is reduced. This reduction in effective charging voltage translates directly into a power savings. Additional power is saved as a result of the fact that charge that would otherwise have been dumped to ground is now being reclaimed at some non-zero voltage and re-used to power other system components. Indeed, it is even possible, after up converting the voltage, to re-supply charge needed by the driver circuit disclosed herein. Thus, it is possible and highly advantageous to reclaim charge used by the disclosed circuit. Such reclaimed charge can either be reused directly at a lower voltage to power other system components or else elevated in potential (via a DC to DC converter) and re-used to power the driver circuit disclosed herein.

The present invention is a high speed, high voltage driver circuit optimized to provide power efficiency and low cost in switching applications involving tunable dielectric materials. In such applications, the dielectric constant of the tunable material is a function of applied bias voltage. The dielectric constant changes from one value to another by altering the voltage applied across the tunable dielectric material. The disclosed low cost circuit converts a digital input word to a proportional, analog, high voltage level and holds the level in a ready state until it is needed. At a precise moment in time dictated by an external timing signal, the disclosed circuit applies the readied voltage level to a load. The time required to apply the readied voltage is necessarily very short (tens of nano-seconds). The basic digital to analog conversion required to generate the high voltage is accomplished by regulating the charging time of a switched source capacitor in proportion to a digital input word. High switching rates and high switching speeds are aided by the use of two independent channels that can be alternately connected to the intended load via high speed, solid-state switches. One channel provides the needed output voltage during a first time period while the other channel is being readied to provide the needed output voltage during a subsequent time period. Power efficiency is further improved by reusing charge stored on the switched output capacitors from one switching operation to the next.

The disclosed driver circuit is useful in a wide range of applications involving tunable dielectric materials. Tunable dielectric materials including barium strontium titanate are disclosed in U.S. Pat. No. 5,312,790 to Sengupta, et al. entitled "Ceramic Ferroelectric Material"; U.S. Pat. No. 5,427,988 to Sengupta, et al. entitled "Ceramic Ferroelectric Composite Material-BSTO-MgO"; U.S. Pat. No. 5,486,491 to Sengupta, et al. entitled "Ceramic Ferroelectric Composite Material - $BSTO-ZrO_2$"; U.S. Pat. No. 5,635,434 to Sengupta, et al. entitled "Ceramic Ferroelectric Composite Material-BSTO-Magnesium Based Compound"; U.S. Pat. No. 5,830,591 to Sengupta, et al. entitled "Multilayered Ferroelectric Composite Waveguides"; U.S. Pat. No. 5,846,893 to Sengupta, et al. entitled "Thin Film Ferroelectric Composites and Method of Making"; U.S. Pat. No. 5,766,697 to Sengupta, et al. entitled "Method of Making Thin Film Composites"; U.S. Pat. No. 5,693,429 to Sengupta, et al. entitled "Electronically Graded Multilayer Ferroelectric Composites"; and U.S. Pat. No. 5,635,433 to Sengupta, entitled "Ceramic Ferroelectric Composite Material-BSTO-ZnO". These patents are hereby incorporated by reference. In addition, copending, commonly assigned United States patent applications Ser. No. 09/594,837, filed Jun. 15, 2000, and Ser. No. 09/768,690, filed Jan. 24, 2001, disclose additional tunable dielectric materials and are also incorporated by reference. The materials shown in these patents, especially BSTO-MgO composites, show low dielectric loss and high tunability. Tunability is defined as the fractional change in the dielectric constant with applied voltage.

Examples of the type of tunable dielectric devices that may be driven by the circuit and method of this invention as illustrated in published PCT patent applications PCTIUS99/24161, PCT/US99/26113, and PCT/US99/29230. Applications vary with regard to the required voltage level, the required switching time, and the amount of power available to perform switching. However, regardless of an application's specific requirements, high voltage capability, fast switching times, and low power consumption are all generally considered desirable characteristics of a high voltage driver intended for driving tunable dielectric components.

While the present invention has been described in terms of what is at present believed to be its preferred embodiment, it will be apparent to those skilled in the art that various changes may be made to the disclosed embodiment without departing from the scope of the invention as defined by the following claims.

What is claimed is:

1. A circuit for providing a control voltage for tunable dielectric devices, the circuit comprising:
   means for receiving a voltage command signal;
   means for establishing a desired voltage level on a first capacitor in response to the voltage command signal; and
   means for switching voltage on the first capacitor to a tunable dielectric device to control a dielectric constant of tunable dielectric material in the tunable dielectric device.

2. The circuit of claim 1, wherein the means for establishing a desired voltage level on the first capacitor in response to the voltage command signal comprises:
   means for alternatively charging the first capacitor to the desired voltage level if a pre-existing voltage level on the first capacitor is less than the desired voltage level, or discharging the first capacitor to the desired voltage level if the pre-existing voltage level on the first capacitor is greater than the desired voltage level.

3. The circuit of claim 1, wherein the means for establishing a desired voltage level on the first capacitor in response to the voltage command signal comprises:
   means for producing a first voltage signal representative of the voltage command signal;
   means for comparing the first voltage signal to a second voltage signal representative of a pre-existing voltage on the first capacitor;
   means for alternatively charging the first capacitor if the first voltage signal exceeds the second voltage signal or discharging the first capacitor if the second voltage signal exceeds the first voltage signal.

4. The circuit of claim 1, further comprising:
   means for establishing a desired voltage level on a second capacitor in response to the voltage command signal; and
   means for switching voltage on the second capacitor to the tunable dielectric device to control the dielectric constant of the tunable dielectric material in the tunable dielectric device.

5. The circuit of claim 4, wherein:
   the means for establishing a desired voltage level on the first capacitor in response to the voltage command signal comprises means for alternatively charging the first capacitor to the desired voltage level if a pre-existing voltage level on the first capacitor is less than the desired voltage level, or discharging the first capacitor to the desired voltage level if the pre-existing voltage level on the first capacitor is greater than the desired voltage level; and
   the means for establishing a desired voltage level on the second capacitor in response to the voltage command signal comprises means for alternatively charging the second capacitor to the desired voltage level if a pre-existing voltage level on the second capacitor is less than the desired voltage level, or discharging the second capacitor to the desired voltage level if the pre-existing voltage level on the second capacitor is greater than the desired voltage level.

6. The circuit of claim 4, further comprising:
   means for producing a first voltage signal representative of the voltage command signal; and
   wherein the means for establishing a desired voltage level on the first capacitor in response to the voltage command signal comprises means for comparing the first voltage signal to a second voltage signal representative of a pre-existing voltage on the first capacitor, and means for alternatively charging the first capacitor if the first voltage signal exceeds the second voltage signal or discharging the first capacitor if the second voltage signal exceeds the first voltage signal;
   wherein the means for establishing a desired voltage level on the second capacitor in response to the voltage command signal comprises means for comparing the first voltage signal to a third voltage signal representative of a pre-existing voltage on the second capacitor, and means for alternatively charging the second capacitor if the first voltage signal exceeds the third voltage signal or discharging the second capacitor if the third voltage signal exceeds the first voltage signal.

7. A circuit for providing a control voltage for tunable dielectric devices, the method comprising:
   an input for receiving a voltage command signal;
   a first capacitor;
   a first charging circuit for charging the first capacitor to a desired voltage level in response to the voltage command signal; and
   a first switch for connecting the first capacitor to a tunable dielectric device to control a dielectric constant of tunable dielectric material in the tunable dielectric device.

8. The circuit of claim 7, wherein the first charging circuit for charging the first capacitor to a desired voltage level comprises:
   a first comparator for comparing a first voltage signal representative of a pre-existing voltage on the first capacitor with a second voltage signal representative of the voltage command signal;
   a second switch for connecting the first capacitor to a first voltage source when the first voltage signal representative of the pre-existing voltage on the first capacitor is less than the second voltage signal representative of the voltage command signal.

9. The circuit of claim 8, further comprising:
   a second capacitor;
   a second charging circuit for charging the second capacitor to a desired voltage level; and
   a third switch for connecting the second capacitor to the tunable dielectric device to control the dielectric constant of the tunable dielectric material in the tunable dielectric device.

10. The circuit of claim 9, wherein the second charging circuit for charging the second capacitor to a desired voltage level comprises:
    a second comparator for comparing a third voltage signal representative of a pre-existing voltage on the second capacitor with a fourth voltage signal representative of the voltage command signal;
    a fourth switch for connecting the second capacitor to the first voltage source when the third voltage signal representative of the pre-existing voltage on the second capacitor is less than the fourth voltage signal representative of the voltage command signal.

11. The circuit of claim 8, wherein the first charging circuit for charging the first capacitor to a desired voltage level further comprises:
    a second comparator for comparing the first voltage signal representative of the pre-existing voltage on the first capacitor with a third voltage signal representative of the voltage command signal; and
    a third switch for connecting the first capacitor to a second voltage source when first voltage signal representative of the pre-existing voltage on the first capacitor is greater than the third voltage signal representative of the voltage command signal.

12. The circuit of claim 11, further comprising:
    a second capacitor;
    a second charging circuit for charging the second capacitor to a desired voltage level; and
    a fourth switch for connecting the second capacitor to the tunable dielectric device to control the dielectric constant of the tunable dielectric material in the tunable dielectric device.

13. The circuit of claim 12, wherein the second charging circuit for charging the second capacitor to a desired voltage level comprises:
    a third comparator for comparing a fourth voltage signal representative of a pre-existing voltage on the second capacitor with a fifth voltage signal representative of the voltage command signal;
    a fifth switch for connecting the second capacitor to the first voltage source when the fourth voltage signal representative of the pre-existing voltage on the second capacitor is less than the fifth voltage signal representative of the voltage command signal.

14. The circuit of claim 13, wherein the second charging circuit for charging the second capacitor to a desired voltage level further comprises:
    a fourth comparator for comparing a sixth voltage signal representative of the pre-existing voltage on the second capacitor with a seventh voltage signal representative of the voltage command signal; and
    a sixth switch for connecting the second capacitor to the second voltage source when the sixth voltage signal representative of the pre-existing voltage on the second capacitor is greater than the seventh voltage signal representative of the voltage command signal.

15. A method for providing a control voltage for tunable dielectric devices, the method comprising the steps of:
    receiving a voltage command signal;
    establishing a desired voltage level on a first capacitor in response to the voltage command signal; and
    switching voltage on the first capacitor to a tunable dielectric device to control a dielectric constant of tunable dielectric material in the tunable dielectric device.

16. The method of claim 15, wherein the step of establishing a desired voltage level on the first capacitor in response to the voltage command signal comprises the steps of:
    alternatively charging the first capacitor to the desired voltage level if a pre-existing voltage level on the first capacitor is less than the desired voltage level, or discharging the first capacitor to the desired voltage level if the pre-existing voltage level on the first capacitor is greater than the desired voltage level.

17. The method of claim 15, wherein the step of establishing a desired voltage level on the first capacitor in response to the voltage command signal comprises the steps of:
    producing a first voltage signal representative of the voltage command signal;
    comparing the first voltage signal to a second voltage signal representative of a pre-existing voltage on the first capacitor;
    alternatively charging the first capacitor if the first voltage signal exceeds the second voltage signal or discharging the first capacitor if the second voltage signal exceeds the first voltage signal.

18. The method of claim 15, further comprising the steps of:
    establishing a desired voltage level on a second capacitor in response to the voltage command signal; and
    switching voltage on the second capacitor to the tunable dielectric device to control the dielectric constant of the tunable dielectric material in the tunable dielectric device.

19. The method of claim 18, wherein the step of establishing a desired voltage level on the second capacitor in response to the voltage command signal comprises the steps of:

alternatively charging the second capacitor to the desired voltage level if a pre-existing voltage level on the second capacitor is less than the desired voltage level; or discharging the second capacitor to the desired voltage level if a pre-existing voltage level on the second capacitor is greater than the desired voltage level.

20. The method of claim 18, wherein the step of establishing a desired voltage level on the second capacitor in response to the voltage command signal comprises the steps of:

producing a first voltage signal representative of the voltage command signal;

comparing the first voltage signal to a second voltage signal representative of a pre-existing voltage on the first capacitor;

alternatively charging the first capacitor if the first voltage signal exceeds the second voltage signal or discharging the second capacitor if the second voltage signal exceeds the first voltage signal;

producing a third voltage signal representative of the voltage command signal;

comparing the third voltage signal to a fourth voltage signal representative of a pre-existing voltage on the second capacitor; and alternatively charging the second capacitor if the third voltage signal exceeds the fourth voltage signal or discharging the second capacitor if the fourth voltage signal exceeds the third voltage signal.

* * * * *

UNITED STATES PATENT AND TRADEMARK OFFICE
CERTIFICATE OF CORRECTION

PATENT NO.    : 6,535,076 B2
DATED         : March 18, 2003
INVENTOR(S)   : Partridge et al.

It is certified that error appears in the above-identified patent and that said Letters Patent is hereby corrected as shown below:

Title page,
Item [73], replace with
-- Paratek Microwave, Inc.
6935 Oakland Mills Road
Suite N
Columbia, Maryland 21045 --.

Column 1,
Line 59, replace "-command" with -- command --

Column 7,
Line 41, replace "PCTIUS99/" with -- PCT/US99/ --

Signed and Sealed this

Nineteenth Day of August, 2003

JAMES E. ROGAN
*Director of the United States Patent and Trademark Office*